United States Patent [19]

Matney

[11] Patent Number: 4,888,725
[45] Date of Patent: Dec. 19, 1989

[54] SUBTRACTION OF WIDE BAND SIGNALS
[75] Inventor: Earl G. Matney, Newberg, Oreg.
[73] Assignee: Tektronix, Inc., Beaverton, Oreg.
[21] Appl. No.: 257,255
[22] Filed: Oct. 13, 1988
[51] Int. Cl.⁴ .............................................. H03H 7/10
[52] U.S. Cl. .................................. 364/807; 364/602; 364/825
[58] Field of Search ............. 364/602, 807, 862, 825; 333/165; 358/21 R, 163

[56] References Cited
U.S. PATENT DOCUMENTS

| | | | |
|---|---|---|---|
| 4,035,628 | 7/1977 | Lampe | 364/825 |
| 4,063,200 | 12/1977 | Mattern | 364/602 X |
| 4,323,864 | 4/1982 | Ogawa | 333/165 |
| 4,667,298 | 5/1987 | Wedil | 364/825 |

Primary Examiner—Michael R. Fleming
Attorney, Agent, or Firm—Francis I. Gray

[57] ABSTRACT

A circuit for subtracting wide band signals without requiring an amplifier having good common mode rejection converts each wide band signal into opposing currents. A switching network applies the desired current for each wide band signal to a summing node. The combined current at the summing node is input to a drive amplifier to produce an output signal that is the desired combination of the wide band signals.

6 Claims, 1 Drawing Sheet

4,888,725

SUBTRACTION OF WIDE BAND SIGNALS

BACKGROUND OF THE INVENTION

The present invention relates to signal processing, and more particularly to the subtraction of wide band signals, such as high definition television video signals, for observing timing errors between various components of the signals.

For many applications the subtraction of signals is desirable. For example in the television arts it is desirable to check for timing errors between the signal components of a video signal over an entire horizontal video line, and the subtraction of component signals is one method for providing a visual display on a waveform monitor of such errors. However the subtracting of signals becomes more difficult at higher frequencies due to the need to match phase as well as amplitude over a wide band of frequencies. Any circuit component mismatches introduce various parasitic impedances that are frequency dependent, especially parasitic capacitances introduced by active electronic devices such as transistors.

Subtraction of signals is commonly achieved by inputting the two signals to be subtracted to a differential amplifier, one signal being input to the inverting input and the other to the non-inverting input. To achieve the desired subtraction accuracies at higher frequencies the transistors that make up the differential amplifier have to be well matched and the common mode rejection has to be very good. Typical specifications for common mode rejection are listed at different frequencies, such as 60 Hz, 15 kHz and 4.5 MHz. At 60 Hz and 15 kHz the common mode rejection error typically is 0.5%, but at 4.5 MHz the common mode rejection error becomes 2%. For high definition television video signals with a wide band signal up to 30 MHz, the common mode rejection error becomes unacceptable.

Therefore what is desired is a method of subtracting wide band signals without introducing large frequency dependent errors into the result.

SUMMARY OF THE INVENTION

Accordingly the present invention provides subtraction of wide band signals without the need for an amplifier having good common mode rejection characteristics. The signals to be subtracted are converted into opposing current signals and selectively applied to a summing node to produce an output current signal representing the difference between the signals. The output signal is subsequently converted to a voltage signal to drive an appropriate display device.

The objects, advantages and novel features of the present invention are apparent from the following detailed description when read in conjunction with the appended claims and attached drawing.

DESCRIPTION OF THE PREFERRED EMBODIMENT

Figure 1:
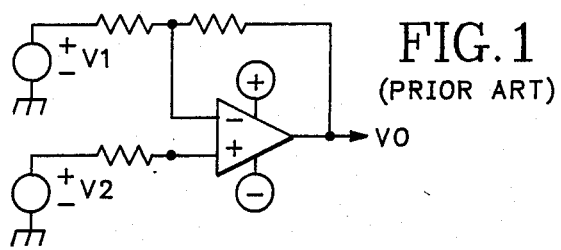
FIG. 1 is a schematic diagram of a prior art circuit for subtracting wide band signals.

Referring now to the prior art of FIG. 1 a first voltage signal V1 is input to the inverting input of a differential amplifier and a second voltage signal V2 is input to the non-inverting input of the differential amplifier. The output Vo of the differential amplifier is:

$Vo = V2 - V1.$

At lower frequencies with matched transistors in the differential amplifier and good common mode rejection characteristics, this circuit provides an adequate subtraction circuit for two signals. However, as discussed above, at higher frequencies phase errors occur that result in unacceptable common mode rejection errors.

Figure 2:
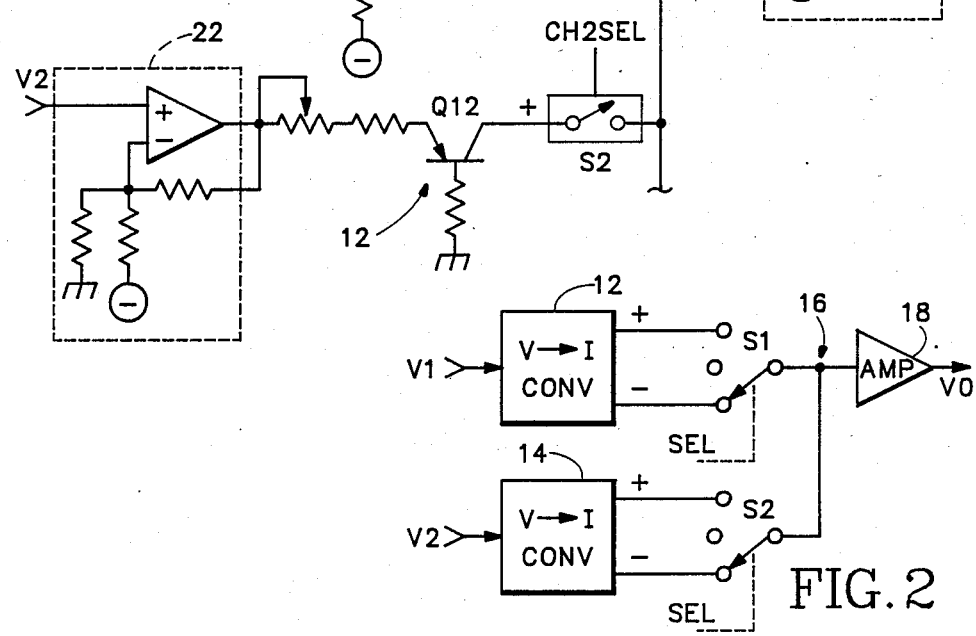
FIG. 2 is a block diagram of a circuit for subtracting wide band signals according to the present invention.

As shown in FIG. 2 the input voltage signals V1, V2 are input to respective voltage to current converters 12, 14. Each voltage to current converter 12, 14 has opposing output currents, a positive current and a negative current output. Respective switches S1, S2 are provided at the output of each voltage to current converter 12, 14 to couple the desired output currents to a summing node 16. The summing node 16 is coupled to the input of a driver amplifier 18 that converts the current at the input to the output signal Vo. With the switches as shown it is apparent that the output signal Vo is the difference between the input signals. The switches S1, S2 are controlled by appropriate SELect commands to provide the desired combination of inputs to the summing point 16.

Figure 3:
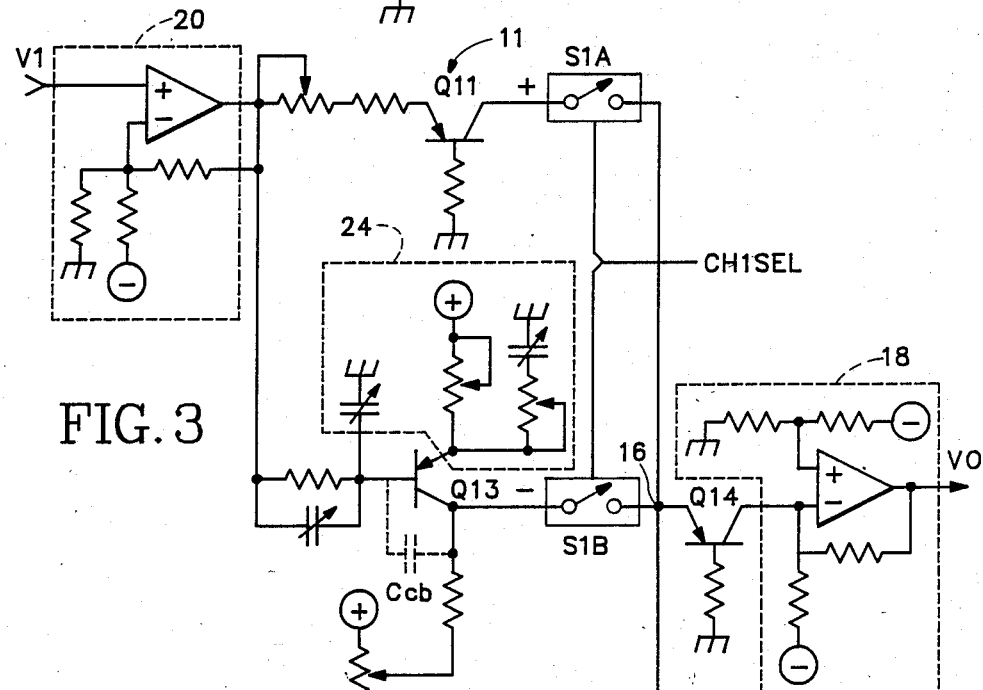
FIG. 3 is a schematic diagram of a circuit for subtracting wide band signals according to the present invention.

The two signals V1, V2 to be subtracted are input to respective input amplifiers 20, 22 to provide buffering and signal gain, as is shown in greater detail in FIG. 3. The output of one input amplifier 20 is coupled to the emitter of a first current transistor Q11 and the base of a second current transistor Q13, both transistors being in a common-base configuration, i.e., the input is across the base-emitter junction and the output is from the collector. The collectors are coupled to switches S1A and S1B, respectively, that provide either the positive current from Q11 or the negative current from Q13 to the summing node 16. Likewise the output of the other amplifier 22 is coupled to the emitter of common base configured transistor Q12 to provide the positive current output to switch S2, the output of the switch S2 being coupled to the summing node 16. A compensating circuit 24 is coupled to transistor Q13 to compensate for the collector-base parasitic capacitance Ccb of the transistor.

Between the summing node 16 and the drive amplifier 18 is another common base configured transistor Q14, having the summing node coupled to the emitter and the drive amplifier coupled to the collector. The transistor Q14 provides a low input impedance for the summing junction 16 to the drive amplifier 18. As discussed above to obtain Vo as the difference of V2 and V1, switch S2 applies the positive current representing V2 to the summing node 16 and switch S1B applies the negative, or inverted, current representing inverted V1 to the summing node. For more than two input channels each channel has a current inverting circuit equivalent to that of Q13, and the currents from the channels are combined at the summing node 16 via appropriate switches in any desirable manner.

Thus the present invention provides for the subtraction of wide band signals without requiring an amplifier with good common mode rejection characteristics by converting the input signals into opposing current signals, and switching the desired signals to a summing node to provide the desired subtraction before being converted back to a voltage output signal by a driver amplifier.

What is claimed is:

1. A circuit for substracting two wide band signals without common mode rejection errors comprising:
   first means for converting one of the wide band current signals to an inverted current signal;
   second means for converting the other wide band signal to a non-inverted current signal; and
   means for summing the current signals to produce an output wide band signal that is the difference between the two wide 2. A circuit as recited in claim 1 wherein the first converting means comprises a first transistor in a common-base configuration having one wide band signal as an input and having the inverted current signal as an output; and
   the second converting means comprises a second transistor in a common-base configuration having the other wide band signal as an input and having the non-inverted current signal as an output.

3. A circuit as recited in claim 2, wherein the summing means comprises:
   a summing node coupled to the current signals; and
   means for converting the current signals at the summing node to the output wide band signal.

4. A circuit as recited in claim 3 wherein the summing means further comprises means coupled between the summing node and the converting means for providing a low impedance input for the summing node to the converting means.

5. A circuit as recited in claim 2 wherein the first converting means further comprises means coupled to the first transistor for compensating for the collector-base capacitance of the first transistor.

6. A circuit for combining a plurality of input signals without common mode rejection errors comprising:
   independent means for each input signal for converting each input signal into opposing current signals;
   means for summing a plurality of current signals to produce an output signal; and
   means for switching desired current signals from the respective converting means to the summing means to produce the output signal representing a desired combination of the input signals without common mode rejection errors.

* * * * *